(12) United States Patent
Pierce

(10) Patent No.: US 9,793,019 B1
(45) Date of Patent: Oct. 17, 2017

(54) LOW TEMPERATURE CHEMICAL PROCESSING OF GRAPHITE-CLAD NUCLEAR FUELS

(71) Applicant: Savannah River Nuclear Solutions, LLC, Aiken, SC (US)

(72) Inventor: Robert A. Pierce, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 876 days.

(21) Appl. No.: 14/226,458

(22) Filed: Mar. 26, 2014

(51) Int. Cl.
*G21F 9/06* (2006.01)
*G21C 19/38* (2006.01)
*G21C 3/20* (2006.01)

(52) U.S. Cl.
CPC .............. *G21C 19/38* (2013.01); *G21C 3/20* (2013.01); *G21Y 2002/60* (2013.01)

(58) Field of Classification Search
CPC ................. G21F 9/06; G21F 9/10; G21F 9/30
USPC .......................................................... 588/18
See application file for complete search history.

(56) References Cited

U.S. PATENT DOCUMENTS

| | | |
|---|---|---|
| 2,535,990 A | 12/1950 | Stengel |
| 3,219,408 A | 11/1965 | Bradley et al. |
| 3,243,256 A | 3/1966 | Rateau |
| 3,322,509 A | 5/1967 | Heinrich et al. |
| 3,393,981 A | 7/1968 | Vogg et al. |
| 3,403,985 A | 10/1968 | Knacke et al. |
| 3,424,564 A | 1/1969 | Bildstein et al. |
| 3,426,671 A | 2/1969 | Ellison et al. |
| 3,453,090 A | 7/1969 | Schulten et al. |
| 3,669,832 A | 6/1972 | Boettcher |
| 4,228,141 A | 10/1980 | Sugikawa et al. |
| 4,502,642 A | 3/1985 | Kronschnabel et al. |
| 4,507,267 A | 3/1985 | Hinssen et al. |
| 5,449,505 A | 9/1995 | Gay |
| 2004/0002623 A1 | 1/2004 | Ohkawa |
| 2011/0216867 A1 | 9/2011 | Srivastava et al. |

FOREIGN PATENT DOCUMENTS

| | | |
|---|---|---|
| GB | 1436995 | 5/1976 |
| JP | 2000-284090 | 10/2000 |

OTHER PUBLICATIONS

Masson et al., "Block-Type HTGR spent fuel processing: CEA investigation program and initial results", Nuclear Eng. and Design (2006) 236:516-525.
"DoE funds further HTGR studies"; World Nuclear News; Jan. 30, 2013.
"Advances in High Temperature Gas Cooled Reactor Fuel Technology"; International Atomic Energy Agency (IAEA-TECDOC-1674).
Kadak, A., "High Temperature Gas Reactors, Briefing to Digital Power Capital".
Spencer et al., "Processing of Spent Triso-Coated Gen IV Reactor Fuels", Actinide and Fission Product Partitioning & Transmutation, Eighth Information Exchange Meeting, Las Vegas, Nevada, USA Nov. 9-11, 2004.
Zarubitskii et al., "Interaction of Graphite with Hydroxide-Salt Melts", Russian J. App. Chem., (2006) 79(4):525-528.
International Patent Application No. PCT/US2014/031833; filing date Mar. 26, 2014; International Search Report and Written Opinion; dated Dec. 1, 2014; (9 pages).

*Primary Examiner* — Edward Johnson
(74) *Attorney, Agent, or Firm* — Dority & Manning, P.A.

(57) ABSTRACT

A reduced-temperature method for treatment of a fuel element is described. The method includes molten salt treatment of a fuel element with a nitrate salt. The nitrate salt can oxidize the outer graphite matrix of a fuel element. The method can also include reduced temperature degradation of the carbide layer of a fuel element and low temperature solubilization of the fuel in a kernel of a fuel element.

19 Claims, 2 Drawing Sheets

LOW TEMPERATURE CHEMICAL PROCESSING OF GRAPHITE-CLAD NUCLEAR FUELS

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

BACKGROUND

Nuclear fuel elements generally include small kernels of fissile or fertile materials coated with one or more layers of carbon and/or ceramics to form fuel particles that are held in a graphite matrix. FIG. 1 illustrates a typical fuel particle 10 that includes an inner kernel 12 of fissile or fertile material. A typical fissile material is a mixture of uranium oxide or uranium carbide, and a fertile material is generally thorium oxide, which is converted to fissile uranium upon irradiation with neutrons. The inner kernel 12 is usually quite small, on the order of about 500 micrometers in diameter. The inner kernel 12 is surrounded by layers of carbon and silicon carbide that serve to contain the radioactive fission products formed during use. Recent developments are considering replacing the silicon carbide with zirconium carbide. For example, as shown in FIG. 1, the inner kernel 12 is surrounded by a first layer 14 of a porous carbon buffer and a layer 18 of pyrolytic carbon. The fuel particle also includes a layer 16 of a ceramic material, generally silicon carbide, and an outer layer 20 of pyrolitic carbon. The outer layers of the particles are generally on the order of about 30-50 micrometers thick each and an individual particle will be on the order of about 900 to 1000 micrometers in diameter.

Fuel particles as illustrated in FIG. 1 are embedded in a graphite matrix. In one common configuration, the particles are dispersed into a graphite matrix and formed into compacts that are generally about 10 to 50 millimeters in diameter and about 50 to 100 millimeters high. The compacts are then embedded into graphite blocks to form a fuel element. Fuel elements of different shapes and sizes have also been developed. A second common configuration is the pebble bed reactor, which utilize fuel elements in the form of spheres in which the fuel particles are embedded in a spherical graphite matrix of about tennis ball or billiard ball size (e.g., about 60 millimeters in diameter).

Whatever the final form of the fuel element, it is necessary to process the used fuel elements to reduce the volume of the radioactive waste for disposal (e.g., the fuel particle content of the fuel element is typically less than 5% by volume) as well as to render the radioactive materials into a safe form for long-term storage. Fuel element processing includes separation of the kernel material from at least the graphite matrix surrounding the fuel particles and, ideally, also from the silicon carbide and carbon layers for recovery and/or disposal.

Methods utilized in the past have included mechanical crushing of the matrix and particle outer layer materials followed by high temperature incineration or gasification of the carbonaceous materials. Unfortunately, methods utilized to date present difficulties. For instance, mechanical crushing of the fuel element can produce fines that require expensive containment procedures and the high temperature processing methods can be quite expensive. Moreover, once the silicon carbide containment layer has been breached, any materials still in contact with the particles must be treated as high level waste.

What is needed in the art is a method for processing used graphite-based fuel elements. For instance, a lower temperature treatment method that can efficiently remove carbon and ceramic encapsulation materials from a fuel kernel would be of great benefit. Moreover, a method that can remove low level waste materials from the fuel particle prior to breach of the silicon carbide layer, so as to prevent contamination of the low level waste with the interior high level waste, would be of use.

SUMMARY

Aspects and advantages of the invention will be set forth in the following description, or may be obvious from the description, or may be learned through practice of the invention.

According to one embodiment, disclosed is a method for processing a graphite-encapsulated nuclear fuel element. The method can include contacting the nuclear fuel element with a nitrate salt that is at a temperature of from about 400° C. to about 700° C. The nuclear fuel element includes a fuel particle and a graphite matrix external to the fuel particle. The fuel particle includes a kernel including a fissile or fertile material. According to the method, the nitrate salt can react with the graphite to chemically oxidize the graphite to carbon dioxide.

A method can include additional steps. For instance in one embodiment the fuel particle can include a layer surrounding the kernel that includes a carbide layer (e.g., silicon carbide or zirconium carbide) and the method can also include contacting the carbide layer of a fuel particle with a an alkali metal hydroxide and a nitrate salt that can be the same or different as the nitrate salt used to oxidize the graphite matrix. The carbide can react with the alkali metal hydroxide and this nitrate salt to remove the carbide.

The fuel particle can also include additional carbon layers, for instance interior to a silicon carbide layer and/or as an external layer on the fuel particle. A nitrate salt can also react with these carbon layers to oxidize the remaining carbon to carbon dioxide. For instance, the nitrate salt that oxidizes the graphite matrix can oxidize the layers of the fuel particle. Alternatively, a second nitrate salt can be provided that can react with an alkali metal hydroxide to remove the carbide layer and to also react with other carbon of the fuel particle.

Methods can also include processing the kernel material, for instance via treatment with nitric acid and/or treatment with a superoxide or peroxide of an alkali metal that can fuse with the fissile or fertile material of the kernel for reduced temperature dissolution during further processing, e.g., for disposal.

Multiple processing steps can be carried out in a one-step method (e.g., all of the various treatment compounds can contact the fuel element in a single process vessel) or in a multi-step sequential method, as desired.

BRIEF DESCRIPTION OF THE FIGURES

A full and enabling disclosure of the present invention, including the best mode thereof, directed to one of ordinary skill in the art, is set forth in the specification, which makes reference to the appended figure, in which.

DETAILED DESCRIPTION

Figure 1:
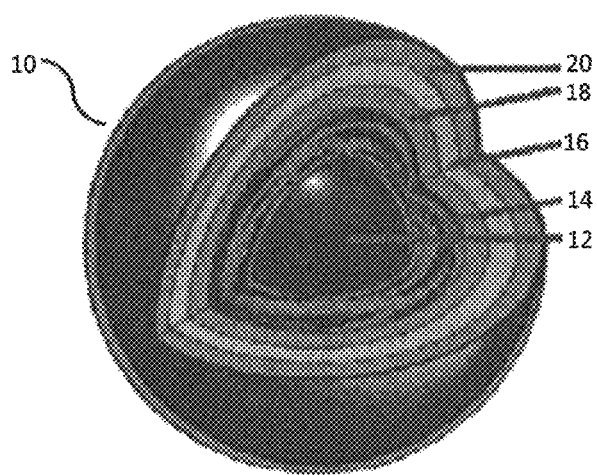
FIG. 1 illustrates a typical fuel element particle.

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, disclosed herein is a reduced-temperature method for treatment of a fuel element. The method includes molten salt chemical degradation of the graphite matrix surrounding a fuel particle. The reduced temperature method can be both more economical and more environmentally friendly as compared to previously known fuel element treatment protocols. The method includes molten salt treatment of a fuel element with a nitrate salt. The nitrate salt can oxidize the graphite to produce carbon dioxide in conjunction with nitrous acid or a carbonate salt and nitrogen, depending upon the nitrate salt that is utilized. Beneficially, the process does not require or generate a highly corrosive environment, as is the case for many previously known treatment methods. In addition, a carbonate salt reaction product can be further treated to regenerate the nitrate salt, further decreasing costs and waste generation volumes.

The nitrate salt that is used to oxidize the graphite matrix can also oxidize other carbon-based layers of a fuel particle such as an external pyrolytic carbon layer, but it will not digest a carbide layer of a fuel particle at the reaction temperatures. This can provide additional benefits to one embodiment of the process. For instance, because release of radioactive carbon-14 ($^{14}C$) presents a variety of issues, degradation of only the carbon components external to the carbide layer, independent of other radioactive isotopes of the fuel element, allows the $^{14}C$ to be captured and isolated from these other materials, obviating the need for a downstream separation process. Moreover, by removal of the external carbon materials prior to breaching the carbide layer, these external materials can be disposed of as low-level waste, which can provide additional savings.

The nitrate salt that chemically oxidizes the graphite matrix can be any nitrate salt that is molten or gaseous and suitably reactive with the graphitic carbon at the reaction temperature. For instance, a metal nitrate salt including, without limitation, an alkaline metal nitrate salt such as sodium nitrate, lithium nitrate, potassium nitrate, etc. that are molten at the reaction temperature can be used as well as other nitrate salts such as calcium nitrate that are molten at the reaction temperature. In one embodiment, the nitrate salt can be nitric acid, $HNO_3$ (i.e., the hydrogen salt of the nitrate anion), which is gaseous at the reaction temperature. Mixtures of nitrate salts are also encompassed for degradation of the graphite.

The graphite matrix of the fuel element as well as any external carbon layers of a fuel particle can be chemically degraded by oxidation upon contact with the nitrate salt. In general, the fuel element can contact the nitrate salt with the salt at a temperature of from about 400° C. to about 700° C., from about 450° C. to about 650° C., or from about 500° C. to about 600° C. in some embodiments. In this temperature range, the nitrate salt can efficiently oxidize the carbon of the graphite matrix while not decomposing too rapidly (e.g., sodium nitrate begins to decompose at about 400° C. with rapid decomposition above 700° C.).

The degradation reaction when using a metal nitrate salt can produce a carbonate in conjunction with carbon dioxide and nitrogen. For example, when utilizing a molten sodium nitrate salt, the degradation reaction scheme is as follows:

$$2NaNO_3 + C \rightarrow 2NaNO_2 + CO_2$$

$$4NaNO_2 + 3C \rightarrow 2Na_2CO_3 + CO_2 + 2N_2$$

with a net reaction of:

$$4NaNO_3 + 5C \rightarrow 2Na_2CO_3 + 3CO_2 + 2N_2$$

When considering utilization of nitric acid as the nitrate salt, the degradation reaction can produce nitrous acid in conjunction with carbon dioxide according to the following net reaction scheme:

$$2HNO_3 + C \rightarrow CO_2 + 2HNO_2$$

The nitrous acid can be recovered as nitric acid using standard methods.

Due to the relatively mild chemistry of the degradation reaction, the reaction vessel need not contain excessively corrosive compounds either prior to, during, or following the reactions. As such, the reactor vessel need not face expensive construction issues associated with highly corrosive reaction environments. For instance, the interior of the reactor vessel can be formed of common stainless steels, nickel alloys or carbon steel as are known in the art.

Depending upon the physical form of the fuel element and the specifics of the process, it may be beneficial to pre-treat the fuel element prior to contact of the fuel element with the nitrate salt. For instance, it may be beneficial to crush or chop the fuel element to increase the available surface area of the fuel element. When considering smaller fuel elements such as the smaller spherical fuel elements utilized in a pebble bed reactor, pre-treatment crushing merely to increase the available surface area for contact with the nitrate salt may not be preferred.

Similarly, in a single-step process in which the fuel element is contacted at one time with several different reactants for degradation of multiple components of the fuel element, it may be beneficial to pre-treat the fuel element by, e.g., crushing, chopping, segmenting, etc. to expose the different components of the fuel element. This may decrease the processing time as in this embodiment, degradation of the various components of the fuel element can be carried out simultaneously rather than sequentially during the single-step process.

The nitrate salt can generally be combined with the fuel element in at least a stoichiometric amount based upon the amount of carbon to be digested. For instance, in one embodiment the nitrate salt can be combined with the fuel element in an amount of from about 3 grams of nitrate salt to about 15 grams of nitrate salt per gram of carbon, or from about 9 grams of nitrate salt to about 12 grams of nitrate salt per gram of carbon, in some embodiments. Actual amounts can depend upon the specific process characteristics and specific carbon content of the fuel element. For instance, in those embodiments in which the nitrate salt is regenerated for recycle to the system, the overall amounts can be much lower.

The reaction process can be carried out in a batch-wise, semi-batch, or continuous flow process. In those embodiments in which the fuel element is contacted with the full amount of the nitrate salt reactant (e.g., in a batch-wise reaction scheme), it is believed that the reaction rate will diminish with time as the reaction proceeds until the oxidant is consumed. In addition, due to potential reactivity concerns, it may be desirable to limit and control the operating temperature. Thus, in one embodiment, a semi-batch or continuous process may be utilized in which the nitrate salt can be combined with the fuel element at a controlled rate. A controlled addition of the nitrate salt can be used to maximize the reaction rate and prevent excessive reaction and undesired temperature response.

The method can also be used to process other components of the fuel element. For instance, the method can be utilized to remove a carbide layer and any remaining carbon layers of a fuel particle. Though referred to primarily as a silicon carbide layer, it should be understood that the disclosed processing methods are equally applicable to other carbide layers such as zirconium carbide, that may form a layer of a fuel particle. For instance, when the fuel particles include a silicon carbide layer, the fuel element can be contacted with an alkali metal hydroxide added to the nitrate salt. The oxidation of the silicon carbide can take place at a temperature that is the same or similar to that of the graphite oxidation process. For instance, a silicon carbide layer can be contacted with a molten bath that includes an alkali metal hydroxide at a temperature of from about 400° C. to about 700° C., from about 450° C. to about 650° C., or from about 500° C. to about 600° C., in some embodiments.

The alkali metal hydroxide can include sodium hydroxide, potassium hydroxide, etc., or mixtures of alkali metal hydroxides. In general, the alkali metal hydroxide will contact the fuel element in conjunction with a nitrate salt that is either the same or different as the nitrate salt used to oxidize the graphite matrix. Following contact, the alkali metal hydroxide and nitrate salt can react with the silicon carbide to form a metal silicate. For instance, sodium hydroxide and sodium nitrate can react with silicon carbide to form sodium silicate according to the following reaction scheme:

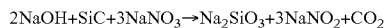

$$2NaOH + SiC + 3NaNO_3 \rightarrow Na_2SiO_3 + 3NaNO_2 + CO_2$$

This reaction causes the SiC layer to disintegrate.

A fuel particle can include additional carbon layers that are interior to the silicon carbide layer. In these embodiments, the inner carbon layers can be oxidized by nitrate salt. For instance, the nitrate salt that reacts with the alkali metal hydroxide to oxidize the silicon carbide can be provided in suitable amount so as to also oxidize the inner carbon layers.

The nitrate salt that oxidizes inner carbon layers can be the same or different as the nitrate salt utilized to oxidize the graphite matrix. In one embodiment, the alkali metal hydroxide and the nitrate salt(s) can be based upon the same alkali metal (e.g., a mixture including sodium hydroxide and sodium nitrate can be utilized). This is not a requirement of the process, however, and the hydroxide component and the nitrate salt can be based upon different cations.

The nitrate salt used at this stage can oxidize any remaining carbon of the fuel element. For instance, the nitrate salt can oxidize the pyrolytic carbon layer and an inner amorphous carbon layer of a fuel particle according to the reaction scheme discussed above. As with the degradation of the graphite matrix, the reaction can produce carbon dioxide in conjunction with a carbonate salt and nitrogen or nitrous acid, depending upon the nitrate salt that is utilized.

The products of these reactions can be treated according to known methods for disposal of the high-level waste.

The method can also be utilized to process the fuel kernel at the interior of the fuel element. For instance, the fuel kernel can be processed according to higher oxide processing or nitric acid processing as is known in the art.

In one embodiment the fuel kernel can be contacted with a molten metal superoxide or peroxide at a temperature of from about 350° C. to about 700° C. In one embodiment the fuel kernel can be processed at the same or similar temperature as may be utilized for processing the other components of the fuel element.

The metal superoxide or peroxide can include an alkali or alkaline earth metal superoxide or peroxide that is stable and in a liquid state at the reaction temperature. For example, a molten bath including potassium superoxide ($KO_2$), sodium peroxide ($Na_2O_2$), barium peroxide ($BaO_2$), etc. as well as mixtures of metal superoxides and/or peroxides can be utilized.

The melt can also incorporate materials as are generally known, such as oxygen that can be added to the melt during the reaction, an alkali metal hydroxide, and so forth. In general, the metal superoxide or metal peroxide can constitute from about 25% to about 70% of a molten bath that is utilized to process the inner fuel kernel, with the remainder of the bath including hydroxides or oxides of the metal.

The fissile materials of the fuel kernel (e.g., uranium oxide, uranium carbide, etc.) can fuse with the peroxide or superoxide and be solubilized in the melt, from which they can be further processed for disposal according to known methods.

In another embodiment, the fuel kernel materials can be dissolved according to standard nitric acid processing methodology and then processed for disposal according to standard practice.

In yet another embodiment, the fuel kernel can be processed according to multiple protocols. For instance, the uranium-based materials of the fuel kernel can be solubilized by use of a peroxide (which does not react with other fuel materials such as thorium-based materials), and the other materials of the fuel kernel (e.g., thorium-based materials) can be solubilized by use of nitric acid. Such a combined process may be utilized, for example, to separate different materials present in the fuel kernels.

Figure 2:
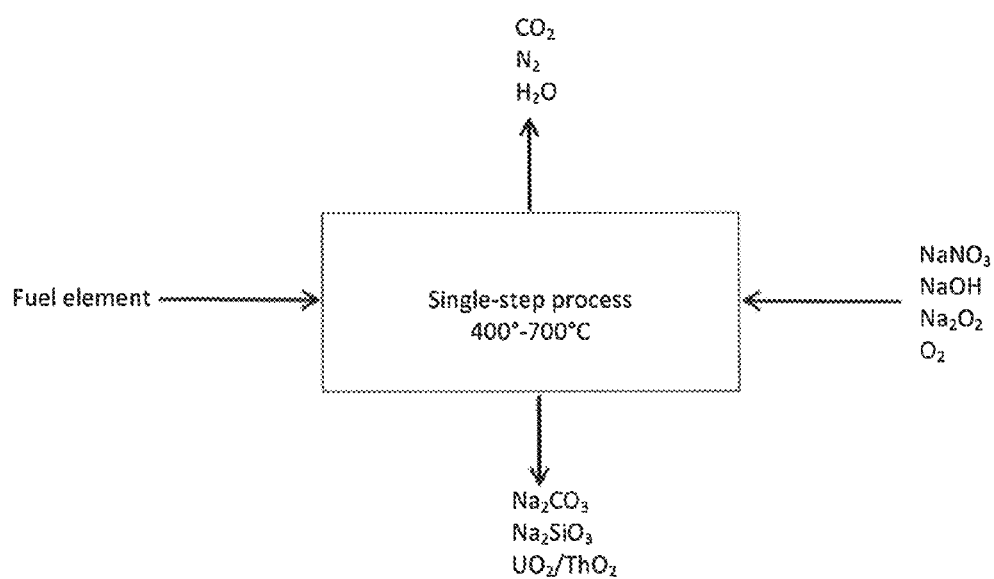
FIG. 2 is a flow chart for a single-step method as disclosed herein.

A process to remove multiple components from a fuel element can be carried out according to a single-step or a multi-step process. For instance, FIG. 2 illustrates a flow diagram for a single-step process in which the fuel element is contacted with a melt including sodium nitrate, sodium hydroxide, and sodium peroxide, with additional oxygen added during the process.

According to this single-step process, a fuel element (e.g., a spherical fuel element for use in a pebble bed reactor as illustrated in FIG. 1) can be combined in a reaction vessel with a liquid that includes molten sodium nitrate. Following an initial oxidation reaction between the sodium nitrate, the graphite matrix, and any external carbon layers of the fuel particle, sodium hydroxide and sodium peroxide can be added to the reaction vessel to oxidize or solubilize remaining components of the fuel element. During the reactions, oxygen can also be added as needed to the reaction vessel.

The degradation of the various components can be carried out sequentially. Specifically, the sodium nitrate can oxidize the graphite matrix external to the fuel particle and any carbon layers external to the silicon carbide layer of the fuel particle. Following this initial oxidation reaction, the silicon carbide layer of the fuel particle can be exposed, and the sodium hydroxide and sodium nitrate can react with the silicon carbide to degrade this layer. The reactant mixture can include sufficient sodium nitrate to also oxidize the carbon-based layers that are interior to the silicon carbide layer. The inner fuel kernel can be exposed following this second degradation step, and the fissile materials of the inner kernel can be solubilized by the sodium peroxide. In those embodiments in which the inner fuel kernel may include fertile materials (e.g., thorium oxide), nitric acid can also be added to the reactants to solubilize the thorium oxide of the fuel kernel.

In an alternative embodiment of a single-step method, the fuel element can be pre-treated to crack or segment the fuel element and expose the inner layers of the fuel element. Upon combination with the reactants, oxidation and/or solubilization reactions can take place simultaneously rather than sequentially.

Figure 3:
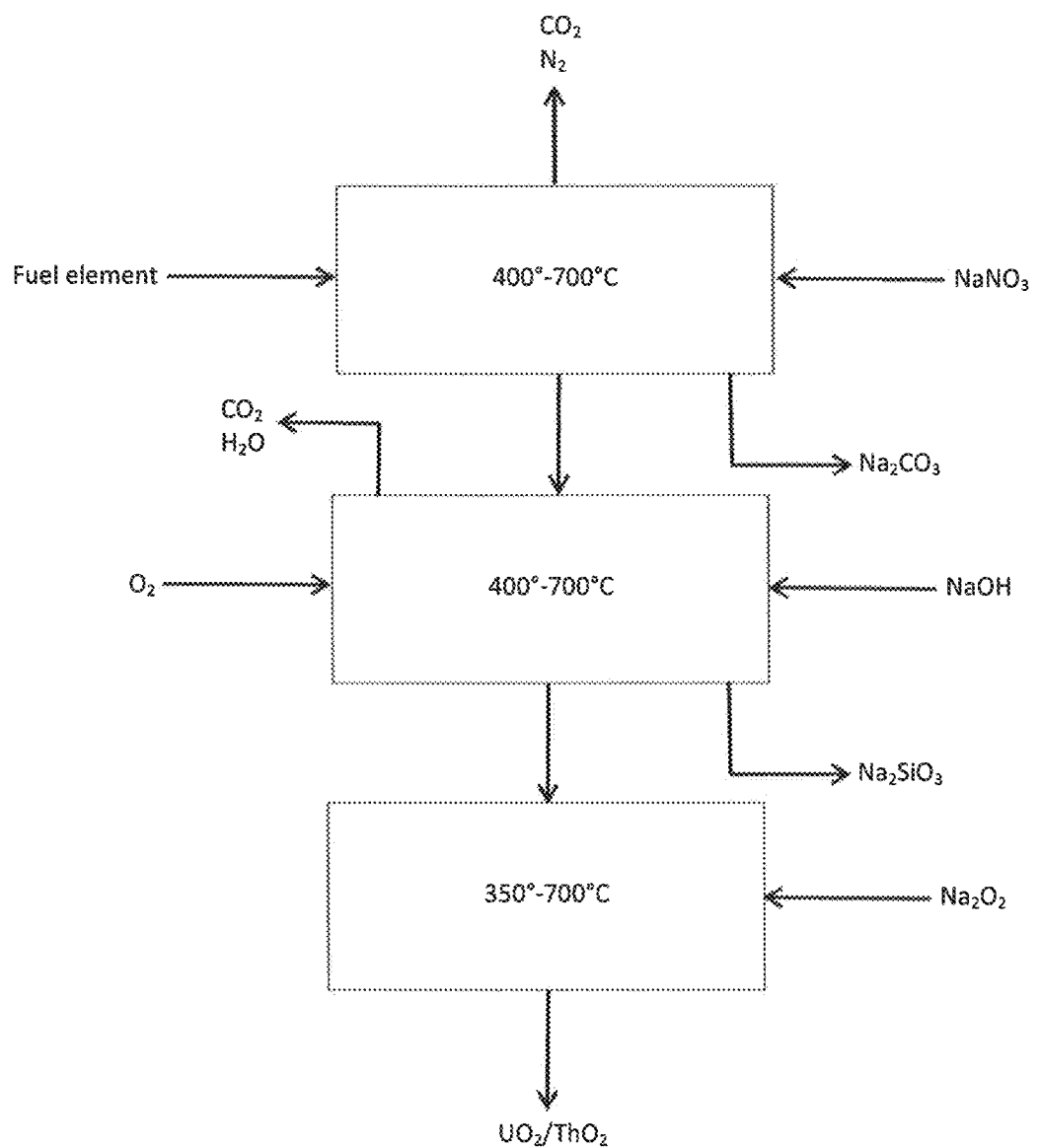
FIG. 3 is a flow chart for a multi-step method as disclosed herein.

FIG. 3 illustrates a multi-step process that is encompassed herein. In this embodiment, the first step of the process can include contacting the fuel element to be treated with a nitrate salt at a relatively low reaction temperature to oxidize the graphite matrix of the fuel element. For instance, as shown, a sodium nitrate melt can be used to produce sodium carbonate, carbon dioxide, and nitrogen in a first step. As this first step can be carried out prior to breach of the silicon carbide layer of the fuel particle, the products of the degradation reaction in this first step can be treated as low-level waste. This may be beneficial as the volume of the inner layers of the fuel particles is generally only from about 2% to about 5% of the total volume of the fuel elements to be treated.

In one embodiment, the carbonate salt formed in this first step can be further treated to regenerate the nitrate salt. Formation of a nitrate salt from a carbonate salt has been carried out previously, and any suitable process may be utilized. For instance, in one embodiment the carbonate salt may be treated with a nitrating agent such as nitric acid at a temperature of from about 100° C. to about 600° C. to form a molten nitrate salt, carbon dioxide, and water. For example a counter-current flow reactor as described in U.S. Pat. No. 2,535,990 to Stengel, which is incorporated herein by reference, may be used.

Following this first step, a second step can be carried out during which the silicon carbide layer and any remaining carbon can be oxidized. In the illustrated embodiment, sodium hydroxide is added at this step. This assumes that sufficient sodium nitrate was added at the first step to oxidize all of the carbon layers of the fuel element as well as the silicon carbide layer. Alternatively, both sodium hydroxide and a nitrate salt may be added at this second step. For instance, if the second step is carried out in a second reactor vessel, it may be preferred to add both reactants at this stage.

A final step of the multi-step process can include solubilization of the fuel kernel materials. For instance, sodium peroxide can be added to the melt to solubilize uranium of the fuel kernel and nitric acid can be added to the melt to solubilize thorium of the fuel kernel (optionally in a separate step). In one embodiment this third step can be carried out simultaneously with the second step, without a separate addition of the sodium peroxide reactant to the melt. In fact, an amount of superoxide or peroxide present during the silicon carbide digestion may benefit the reaction.

Whether carried out in a single-step or multi-step process, a process that oxidizes or solubilizes all component of a fuel element can in one embodiment provide a nitrate salt in an amount of from about 9 g to about 12 g per gram of the fuel element. The total amount of alkaline hydroxide can be provided in an amount of from about 0.5 g to about 2 g per gram of the fuel element, and the higher oxide can be provided in an amount of from about 0.25 to about 0.5 per gram of the fuel element. Of course, specific amounts of the reactants can vary depending upon the characteristics of the fuel element, the regeneration of the nitrate salt, and so forth.

The present disclosure may be better understood with reference to the examples set forth below.

Example 1

Comparative tests were performed with three melts for the digestion of coupons of about 0.4 grams each cut from a graphite crucible. The three melts were NaOH, NaOH/$NaNO_3$, and NaOH/$Na_2O_2$. The melts were heated to 500° C. and the coupons were placed into the melts for 30 minutes. After 30 minutes, because the graphite floated on top of the melts, the samples were withdrawn from the melts, rinsed with water, dried and weighed.

The NaOH melt produced no measurable weight loss in the coupon. The NaOH/$NaNO_3$ melt produced an 84% weight loss. The NaOH/$Na_2O_2$ melt produced a 3% weight loss.

Similar tests were completed with the NaOH/$Na_2O_2$ and NaOH/$NaNO_3$ melts at 600° C. for 20 minutes. The NaOH/$Na_2O_2$ melt reduced the coupon mass by 23% and the NaOH/$NaNO_3$ melt reduced the coupon mass by 100%.

A larger test was completed with a graphite sample of about 7 grams and a NaOH/$NaNO_3$ melt. Due to the vigorousness of the reaction, the test was discontinued after about 4 minutes. In that time the sample weight was reduced by 78%.

Example 2

A silicon carbide test was performed with a NaOH/$NaNO_3$ melt at 600° C. A silicon carbide coupon of about 0.44 grams was placed in the melt and observed after 30 minutes and after 60 minutes. After 30 minutes, the sample had decomposed completely, although there was some residue in the bottom of the melt. After 60 minutes, there were no visible residues, but it was possible that silicon in present as a silicate that could not be seen with the naked eye.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for processing a graphite-encapsulated nuclear fuel element comprising:
    contacting a nuclear fuel element with a first nitrate salt at a temperature of from about 400° C. to about 700° C., the nuclear fuel element including a fuel particle and a graphite matrix external to the fuel particle, the fuel particle comprising a fuel kernel that includes a fissile or a fertile material, the first nitrate salt reacting with the graphite of the graphite matrix to oxidize the graphite to carbon dioxide.

2. The method according to claim 1, the fuel particle further comprising a layer surrounding the fuel kernel that includes a carbide, the method further comprising contacting the carbide with an alkali metal hydroxide and a second nitrate salt, the carbide reacting with the alkali metal hydroxide and the second nitrate salt to oxidize the carbide.

3. The method according to claim 2, wherein the alkali metal hydroxide is sodium hydroxide.

4. The method according to claim 2, wherein the first nitrate salt and the second nitrate salt are the same.

5. The method according to claim 2, the fuel particle further comprising a carbon layer that is interior to the carbide layer, the second nitrate salt reacting with the carbon layer to oxidize the carbon of the interior carbon layer.

6. The method according to claim 2, wherein the carbide is silicon carbide or zirconium carbide.

7. The method according to claim 1, wherein the method is a single-step method.

8. The method according to claim 1, wherein the method is a multi-step method.

9. The method according to claim 1, further comprising contacting the fuel kernel with a metal superoxide or peroxide to solubilize the fissile or fertile material of the fuel kernel.

10. The method according to claim 9, wherein the metal superoxide or peroxide is sodium peroxide.

11. The method according to claim 1, further comprising contacting the fuel kernel with nitric acid to solubilize the fissile or fertile material of the fuel kernel.

12. The method according to claim 1, wherein the first nitrate salt is an alkaline metal nitrate salt, the first nitrate salt reacting with the graphite to oxidize the graphite and produce a carbonate salt of the alkaline metal.

13. The method according to claim 1, further comprising regenerating the first nitrate salt following the oxidation reaction.

14. The method according to claim 1, wherein the first nitrate salt is sodium nitrate.

15. The method according to claim 1, wherein the first nitrate salt is nitric acid.

16. The method according to claim 1, the fuel particle further comprising an external carbon layer, the first nitrate salt reacting with the carbon of the external carbon layer to oxidize the carbon.

17. The method according to claim 1, further comprising pre-treating the fuel element.

18. The method according to claim 1, wherein the first nitrate salt is contacted with the fuel element at a controlled rate during the course of the degradation reaction.

19. The method according to claim 1, wherein the fuel element is a spherical fuel element.

* * * * *